(12) United States Patent
Dhuyvetter et al.

(10) Patent No.: US 7,864,546 B2
(45) Date of Patent: Jan. 4, 2011

(54) DC-DC CONVERTER WITH COMMUNICATION ACROSS AN ISOLATION PATHWAY

(75) Inventors: Timothy A. Dhuyvetter, Arnold, CA (US); Sajol Ghoshal, El Dorado Hills, CA (US)

(73) Assignee: Akros Silicon Inc., Folsom, CA (US)

( * ) Notice: Subject to any disclaimer, the term of this patent is extended or adjusted under 35 U.S.C. 154(b) by 588 days.

(21) Appl. No.: 11/674,432

(22) Filed: Feb. 13, 2007

(65) Prior Publication Data

US 2008/0192509 A1 Aug. 14, 2008

(51) Int. Cl.
*H02M 3/335* (2006.01)
(52) U.S. Cl. ........................................................ 363/17
(58) Field of Classification Search .................... 363/16, 363/17, 97, 98, 132, 147
See application file for complete search history.

(56) References Cited

U.S. PATENT DOCUMENTS

| | | | |
|---|---|---|---|
| 3,906,331 A * | 9/1975 | Hamilton et al. ............. 340/635 |
| 4,748,419 A | 5/1988 | Somerville |
| 4,757,528 A | 7/1988 | Falater et al. |
| 5,701,037 A | 12/1997 | Weber et al. |
| 5,818,112 A | 10/1998 | Weber et al. |
| 5,952,849 A | 9/1999 | Haigh |
| 6,058,027 A | 5/2000 | Vargha et al. |
| 6,124,756 A | 9/2000 | Yaklin et al. |
| 6,147,542 A | 11/2000 | Yaklin |
| 6,182,172 B1 | 1/2001 | Schwan |
| 6,208,531 B1 | 3/2001 | Vinciarelli et al. |
| 6,249,171 B1 | 6/2001 | Yaklin et al. |
| 6,407,432 B1 | 6/2002 | Nemoto et al. |
| 6,525,566 B2 | 2/2003 | Haigh et al. |
| 6,563,718 B1 * | 5/2003 | Li et al. ......................... 363/16 |
| 6,603,807 B1 | 8/2003 | Yukutake et al. |
| 7,005,835 B2 * | 2/2006 | Brooks et al. ................ 323/282 |
| 7,064,442 B1 | 6/2006 | Lane et al. |
| 7,075,329 B2 | 7/2006 | Chen et al. |
| 7,116,565 B1 * | 10/2006 | Yang ............................ 363/24 |
| 7,193,864 B2 * | 3/2007 | Hansson et al. .............. 363/16 |
| 7,701,731 B2 * | 4/2010 | Dhuyvetter et al. .......... 363/16 |
| 2003/0174528 A1 * | 9/2003 | Wong et al. .................. 363/147 |
| 2004/0155526 A1 | 8/2004 | Naden et al. |
| 2004/0201279 A1 | 10/2004 | Templeton |
| 2005/0152080 A1 | 7/2005 | Harris et al. |
| 2005/0167756 A1 | 8/2005 | Lotfi et al. |
| 2005/0168203 A1 | 8/2005 | Dwarakanath et al. |
| 2005/0169024 A1 | 8/2005 | Dwarakanath et al. |
| 2005/0243496 A1 | 11/2005 | Harris |
| 2005/0269657 A1 | 12/2005 | Dupuis |
| 2005/0271147 A1 | 12/2005 | Dupuis |
| 2005/0271148 A1 | 12/2005 | Dupuis |
| 2005/0271149 A1 | 12/2005 | Dupuis |
| 2005/0272378 A1 | 12/2005 | Dupuis |

(Continued)

*Primary Examiner*—Adolf Berhane
*Assistant Examiner*—Yemane Mehari
(74) *Attorney, Agent, or Firm*—Koestner Bertani LLP; Ken J. Koestner

(57) ABSTRACT

A power converter comprises a direct current (DC)-DC converter configured to receive an input voltage in a primary domain, a transformer coupled to and driven by the DC-DC converter and supplying an output voltage in a secondary domain, and a transmission path configured to pass a digital feedback signal through an isolation barrier from the secondary domain to the primary domain.

39 Claims, 15 Drawing Sheets

U.S. PATENT DOCUMENTS

| | | |
|---|---|---|
| 2005/0288799 A1 | 12/2005 | Brewer et al. |
| 2006/0022860 A1* | 2/2006 | Storvik et al. ............... 341/155 |
| 2006/0098363 A1 | 5/2006 | Hebert et al. |
| 2006/0098364 A1 | 5/2006 | Harris et al. |
| 2006/0098373 A1 | 5/2006 | Hebert et al. |
| 2006/0176638 A1 | 8/2006 | Coates |

* cited by examiner

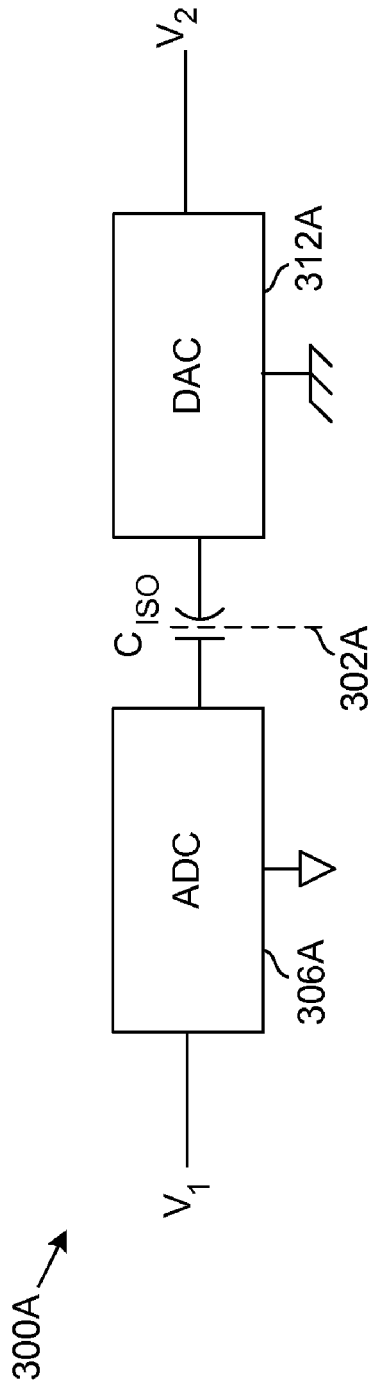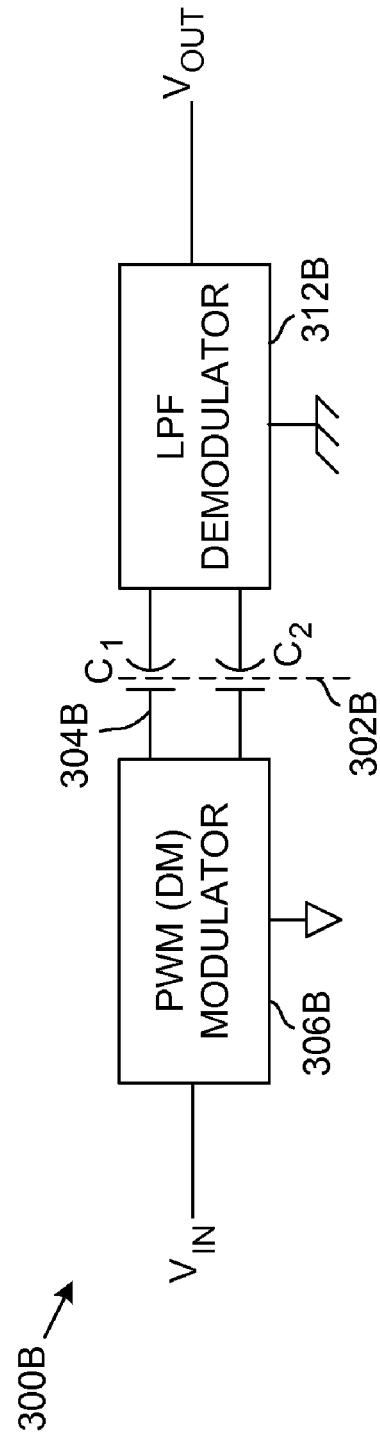

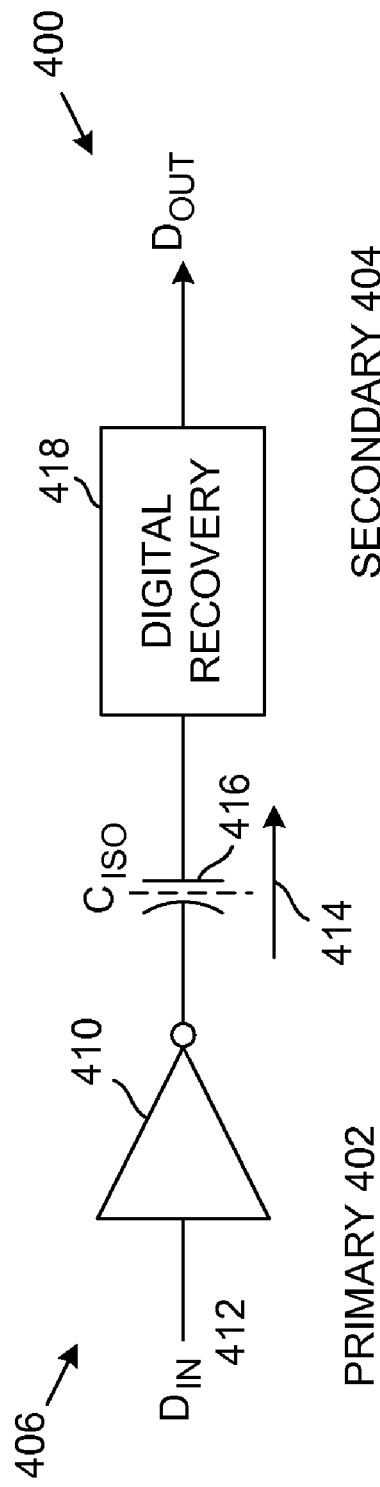
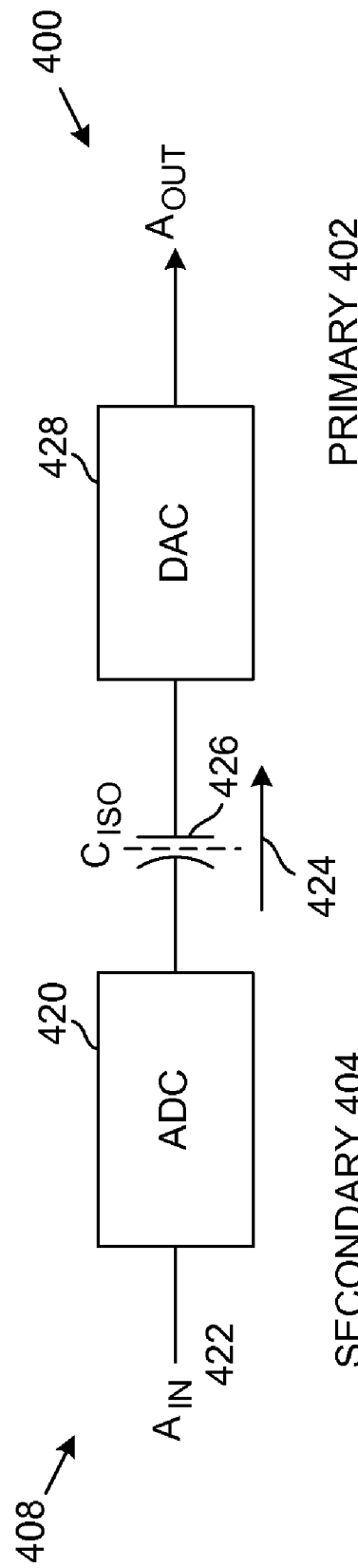
FIG. 4B
FIG. 4C

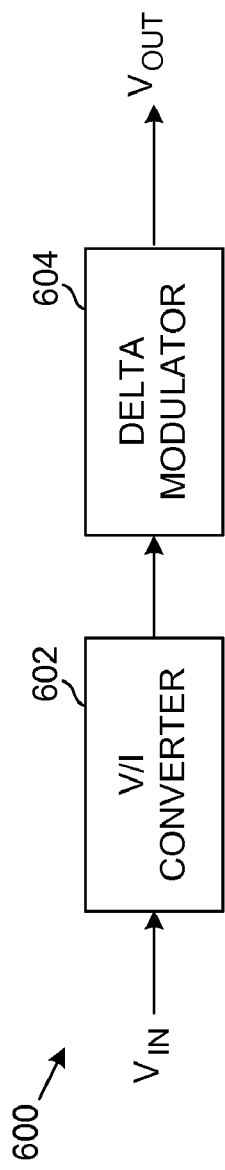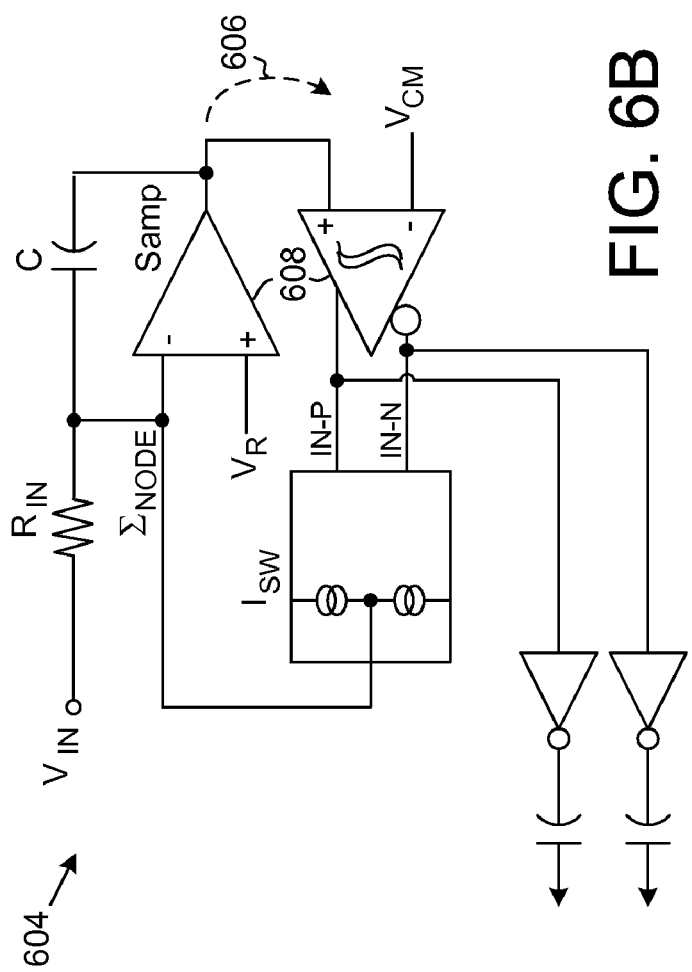
FIG. 6A
FIG. 6B

DC-DC CONVERTER WITH COMMUNICATION ACROSS AN ISOLATION PATHWAY

BACKGROUND

Various communications, medical, computing, industrial, and other systems implement isolation barriers to electrically isolate sections of electronic circuitry. An isolator is a device that can transfer a signal between sections of electronic circuitry while maintaining electrical isolation between the sections.

A typical conventional design attains isolation, for example, by connecting to a communication channel through a transformer. The transformer provides isolation both for surge and galvanic isolation. Power can be transmitted on the line through the transformer.

Some circuits and systems have input and output circuitry powered by power supplies that are mutually isolated, for example power supplies with different ground potentials or systems with an isolated DC-DC converter with transformers to derive power for one side of an isolation barrier from power supplied to the other side of the barrier.

SUMMARY

According to an embodiment of a power system, a power converter comprises a direct current (DC)-DC converter configured to receive an input voltage in a primary domain, a transformer coupled to and driven by the DC-DC converter and supplying an output voltage in a secondary domain, and a transmission path configured to pass a digital feedback signal through an isolation barrier from the secondary domain to the primary domain.

BRIEF DESCRIPTION OF THE DRAWINGS

Embodiments of the invention relating to both structure and method of operation may best be understood by referring to the following description and accompanying drawings:

FIGS. 3A, 3B, 3C, and 3D is a set of combined block and circuit diagrams depicting several circuits and associated methods for transmitting an analog signal across an isolation boundary;

FIG. 4B is a block and circuit diagram showing an embodiment of a digital isolator that can be implemented in the power controller;

FIG. 4C is a block and circuit diagram showing an embodiment of an analog isolator that can be implemented in the power controller;

FIGS. 6A, 6B, and 6C illustrate a block diagram and circuit diagrams showing an example of an embodiment of a pulse width modulator that can be used in the illustrative power controllers;

DETAILED DESCRIPTION

Figure 1:
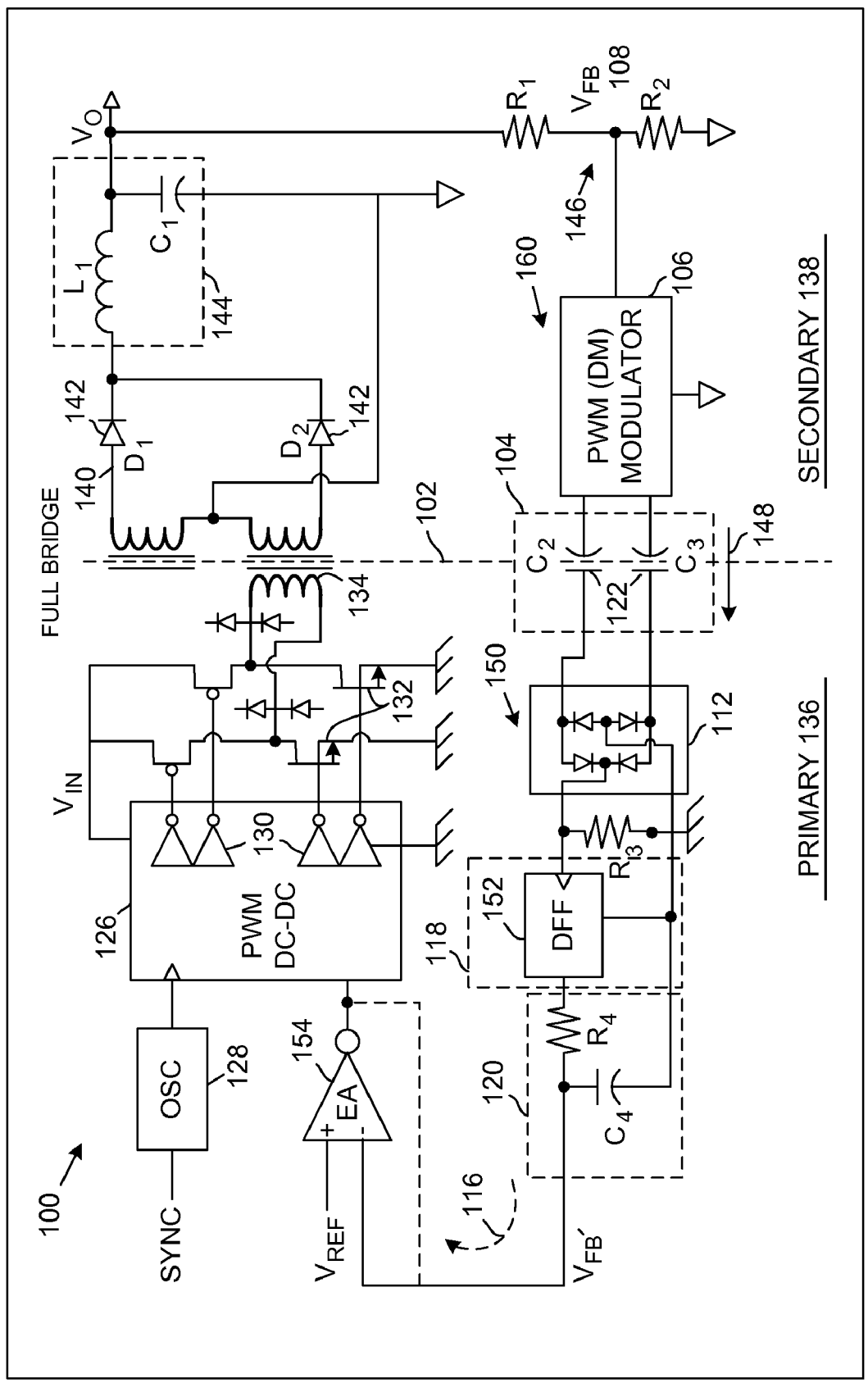
FIG. 1 is a schematic block diagram illustrating an embodiment of a power converter with signal isolation.

Referring to FIG. 1, a schematic block diagram illustrates an embodiment of a power converter 100 with signal isolation. The power converter 100 comprises a direct current (DC)-DC converter 126 configured to receive an input voltage in a primary domain 136 and a transformer 134 coupled to and driven by the DC-DC converter 126 that supplies an output voltage in a secondary domain 138. The power converter 100 further comprises a transmission path 104 that passes a digital feedback signal 108 through an isolation barrier 102 from the secondary domain 138 to the primary domain 136.

In some embodiments, the power converter 100 can comprise a pulse wide modulator (PWM) direct current (DC)-DC converter 126 that drives a full-bridge transformer 134. An oscillator 128 coupled to the PWM DC-DC converter 126 generates an oscillator time base for synchronously driving the PWM DC-DC converter 126.

A rectifier 140 can be coupled to the transformer 134 and a filter 144 can be coupled to the rectifier to supply a filtered output voltage.

In some implementations, the PWM DC-DC converter 126 can comprise multiple internal drivers 130 and multiple external power field effect transistors (FETs) 132 that drive the transformer 134. The rectifier 140 can be implemented as multiple diodes 142 or transmission gates coupled to the transformer 134. The filter 144 can be implemented as an inductor $L_1$ and a capacitor $C_1$ coupled to the rectifier 140 to supply a filtered output voltage.

In some embodiments, the power converter 100 can further comprise the rectifier 140 coupled to the transformer 134 and a resistor divider 146 coupled to the rectifier 140 that produces a feedback voltage $V_{FB}$ in the secondary domain 138. A signal conditioner 106 is coupled to the resistor divider 146 and receives the feedback voltage $V_{FB}$, preconditioning the feedback voltage $V_{FB}$ according to a modulation function. For example, the signal conditioner 106 can be a pulse width modulator (PWM) or delta modulator (DM). One or more capacitors 122 can be\coupled to the signal conditioner 106 to function as an isolated transmission path 104. A signal recovery circuit 150 can be coupled to the isolated transmission path 104 in the primary domain 136 to receive the preconditioned feedback voltage and demodulate the preconditioned feedback voltage, thereby forming a feedback signal for usage in a control loop 116.

In the illustrative embodiment, the transmission path 104 is configured as a differential transmission path with two capacitors 122. In various embodiments, the transmission path 104 can be single-ended or differential.

As depicted in FIG. 1, the transmission path can be considered to comprise a modulator 106 that receives and modulates a signal such as the feedback voltage $V_{FB}$, a diode bridge rectifier 112, and a full differential alternating current (AC) coupling 104 that can transmit the modulated signal from the modulator 106 to the diode bridge rectifier 112 with capacitive-coupled signal isolation. A D flip-flop 152 coupled to the diode bridge rectifier 112 is configured to recover the modulated signal.

In some embodiments, a digital filter 118 coupled to the rectifier 112 recovers the modulated signal. A lowpass filter 120 coupled to the digital filter 118 restores an analog signal.

FIG. 1 shows a general transmission pathway 104 over an isolation barrier 102. The transmission pathway 104 can be either an analog or digital pathway. A signal $V_{FB}$ is applied to a signal conditioner 106 and then to a transmission link 104 including the isolation barrier 102. The signal is then passed through a signal recovery block 112.

The illustrative circuit 100 comprises a pulse width (PWM) or delta (DM) modulator 106, full differential alternating current (AC) coupling 104, and a diode bridge rectifier 112, for example implemented as digital flip-flop lowpass filter 120. In an analog path, direct current (DC) feedback voltage is modulated and passed through the capacitor 122 by oversampling and demodulating up to higher frequency, then low pass filtered to restore analog signal.

In an example embodiment, the transmission pathway 104 can be a feedback pathway, for example a digitized form of feedback that forms a control loop 116. A feedback signal is passed through a modulation function, then the transmission pathway 104 for example passed through one or two capacitors, and through a demodulation of the modulation function. In various implementations, the modulation can be pulse width modulation, delta modulation, frequency modulation, phase modulation, or the like. In a general functional description, an analog input signal can be input to the transmission pathway, digitized, and then passed as a digitized signal through a control loop.

FIG. 1 illustrates a power distribution system 100 that includes a signal isolator. The DC-DC converter 126 in the power distribution system 100 has a time base supplied by an oscillator 128 and includes internal drivers 130 and power field effect transistors (FETs) 132 that are shown external to DC-DC converter 126 but can be internal to the converter in some configurations. As shown, the DC-DC converter 126 can be a pulse width modulator (PWM) converter. The drivers 130 and power FETs 132 drive a transformer 134 and pass power from the primary side 136 to the secondary side 138 through the transformer 134 to a rectifier 140 that is depicted as diodes 142. In other configurations, the rectifier 140 can take other forms such as transmission gates or other devices for which a signal is used to drive the gates or devices on a communication pathway that is omitted in FIG. 1.

Following the diodes 142 is a filter 144 with an inductor L1 and a capacitor $C_1$ that passes an output voltage $V_O$. The output voltage $V_O$ is applied to a resistor divider 146 that forms a feedback voltage $V_{FB}$ and is returned on a feedback pathway 148 by application to a modulator 106, for example a pulse width modulator or a delta modulator. The feedback pathway 148 passes the feedback signal from the secondary side 138 to the primary side 136 across the isolation barrier 102, illustratively by differentially coupling the signal, although a single-ended embodiment can also be formed. Information, including feedback information, is passed from the modulator 106 over the differential capacitors 122 to the primary side 136 where the modulated signal is demodulated. The demodulation has a low pass filtering functionality and is illustratively implemented in a recovery circuit 150 that includes diodes in a diode bridge rectifier 312, a resistor R3, and a D flip-flop 152. The recovered feedback signal can be passed through a lowpass filter 120 which can be a first-order, second-order, or other suitable lowpass filter. The recovered feedback signal $V_{FB'}$ following the lowpass filter 120 is applied to an error amplifier (EA) 154 and passed back to the DC-DC converter 126. The feedback voltage $V_{FB}$ is thus returned to the primary side 136 as recovered feedback signal $V_{FB'}$ and can be passed to the DC-DC converter 126 either through the error amplifier (EA) 154 or directly in some implementations, depending on whether the error amplifier 154 is placed on the primary side 136 or the secondary side 138, or whether functionality is supplied by other circuits in the feedback pathway 148. For example, the error function can be supplied via the illustrative digital (D) flip-flop, which is a positive-edge flip-flop that can perform the error function.

In an example operation of error amplifier functionality, the feedback voltage from 0 to a selected value has a linear transformation so that PWM modulator 106 has a 0 to 100% duty cycle. The frequency does not change as the signal traverses the whole feedback path 148 and information is contained in the duty cycle. For example, if full scale on the secondary side is 1 volt, then 100% would be 1 volt, 50% would be half volt, and 0% would be zero volts. The transformation and recovery reduces the same voltage at feedback voltage $V_{FB}$ with some scale factor K that is arbitrarily chosen. For the selected gain or scale factor, the PWM circuitry uses the factor to set a servo value for the output signal to a predetermined fixed value.

Figure 2:
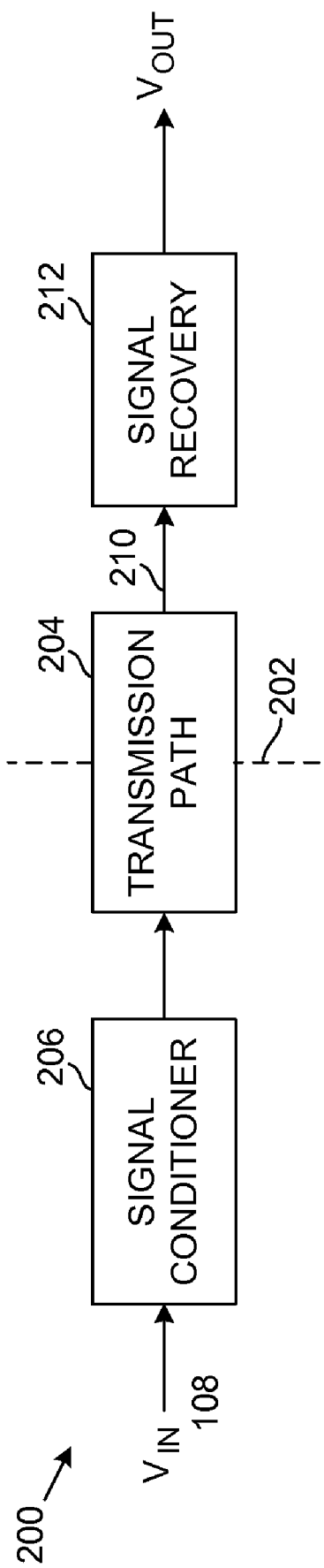
FIG. 2 is a schematic block diagram illustrating an embodiment of a signal isolator that enables a general analog transmission isolation method over an isolation barrier.

FIG. 2 is a schematic block diagram illustrating an embodiment of a signal isolator 200 that enables a general analog transmission isolation method over an isolation barrier 202. Referring to FIG. 2 in combination with FIG. 1, in some embodiments, the power converter 100 can include a signal isolator 160, 200 that further comprises a signal conditioner 206 coupled to a transmission path 204 in the secondary domain 138 that receives and preconditions a signal 208 according to a modulation function and passes the resulting preconditioned signal via the transmission path 204. A signal recovery circuit 212 coupled to the transmission path 204 in the primary domain 136 receives the preconditioned signal 210 via the transmission path 204 and demodulates the preconditioned signal 210, thereby forming a feedback signal $V_{FB'}$ for usage in a control loop 116.

The signal isolator 160, 200 can be configured to modulate a direct current (DC) feedback voltage $V_{FB}$ and pass the DC feedback voltage $V_{FB}$ through one or more capacitors by oversampling and demodulating to a higher frequency.

The signal conditioner 206 receives an input signal Vm that is passed through the transmission path 204 and isolation barrier to the signal recovery circuit 212 that generates the output signal Vout. In various embodiments, the signal conditioner 206 can be implemented as a pulse width modulator, a delta modulator, a frequency modulator, a phase modulator, an analog-to-digital converter (ADC), a predriver that performs preconditioning, a simple flip-flop, digital-to-analog converter (DAC), or other device. The signal recovery circuit 212 acquires an analog input signal, digitize the signal, and pass the digitized signal through a control system 116.

The illustrative signal isolator 200 depicts a general isolation scheme that be used for any kind of transmission, either analog or digital transmission, and forms an isolation barrier by operation of three functional blocks that perform signal conditioning, a transmission path and isolation barrier, and recovery.

The transmission path 204 can be considered to be a digital transmission path that communicates inherently digital signals. In another perspective, the transmission path 204 can pass a digital signal in which information is conveyed in an analog format with pulses passed through the path 204, for example through a capacitor, in characteristics of the signal such as frequency, phase, modulation index, or other attribute.

In a signal isolator implementation that inserts a sampling function in the pathway, an analog signal is converted to a digital form in which each sample has an associated digital value due to quantization of the original signal through the sampling function. The signal recovery circuit 212 can perform the sampling function to attain the digital signal by pulse modulation or other suitable type of general sampling conversion.

Other implementations can include a true analog signal, for example a direct current (DC) feedback voltage that is modulated and passes information through the transmission path 204, such as a capacitor, by oversampling and modulating up to a higher frequency, then using low pass filtering to recover the analog signal.

Referring to FIGS. 3A, 3B, 3C, and 3D, a set of combined block and circuit diagrams depict several circuits and associated methods for transmitting an analog signal across an isolation boundary. Capacitive isolation generally can be used for passing alternative current (AC) or pulsed signals.

FIG. 3A is a schematic block diagram illustrating an embodiment of a signal isolator 300A that enables a general analog transmission isolation method over an isolation barrier 302A. Referring to FIG. 3A in combination with FIG. 1, in some embodiments, the power converter 100 can include a signal isolator 160, 300A that further comprises a signal conditioner configured as an analog to digital converter 306A coupled to the transmission path 304A in the secondary domain 136 that receives an input signal and preconditions the input signal according to an analog to digital conversion modulation function for passing a preconditioned signal via the transmission path 304A. The transmission path 304A can be configured as one or more capacitors $C_{ISO}$. A signal recovery circuit configured as a digital to analog converter 312A or flip-flop coupled to the transmission path 304A in the primary domain 136 receives the preconditioned signal via the transmission path 304A and demodulates the preconditioned signal, forming a feedback signal $V_{FB}$, for usage in the control loop 116.

FIG. 3A shows an embodiment with a generalized structure and form for transmitting an analog signal. An isolator circuit 300A includes an analog to digital converter (ADC) 306A that receives an input voltage $V_I$ and converts the voltage signal to digital form for passage over an isolation barrier 302A to a digital to analog converter (DAC) 312A that converts the signal back to analog form as output voltage $V_O$. Two different symbols are depicted for ground indicating that the ground potential for the primary side and secondary side of the isolation barrier can be different. The analog to digital conversion can take many forms such as a pulse code modulation or other digitization. Conversion can be made from voltage to frequency, voltage to phase, voltage to pulse width, or other suitable parameters.

FIG. 3B is a schematic block diagram illustrating an embodiment of a signal isolator 300B enabling a general analog transmission isolation method over an isolation barrier 302B. Referring to FIG. 3B in combination with FIG. 1, in some embodiments, the power converter 100 can include a signal isolator 160, 300B that further comprises a signal conditioner configured as a pulse width modulator 306B that can precondition a signal and a differential transmission isolation barrier 302B coupled to the pulse width modulator 306B that passes a preconditioned signal. A lowpass filter demodulator 312B coupled to the differential transmission isolation barrier 302B performs error recovery on the passed preconditioned signal.

FIG. 3B depicts an embodiment of an isolator circuit 300B that comprises a pulse width modulator 306B that is configured to precondition a signal and a differential transmission isolation barrier 302B coupled to the pulse width modulator 306B that is configured to pass a preconditioned signal. A lowpass filter demodulator 312B is coupled to the differential transmission isolation barrier 302B and is configured to perform error recovery on the passed preconditioned signal.

The isolator circuit 300B includes a pathway 304B for transmitting an analog signal across an isolation barrier 302B wherein a voltage input signal $V_{IN}$ is applied to a pulse width (PWM) modulator 306B and passed across a capacitively-coupled differential transmission pathway 304B to a low pass filter demodulator 312B. The isolator circuit 300B includes a pulse width modulator (PWM) 306B, a differential transmission isolation barrier 302B, and a low pass filter (LPF) demodulator 312B. The PWM 306B is generally used for signal preconditioning. The LPF demodulator 312B can be used for error recovery.

Figure 3C:
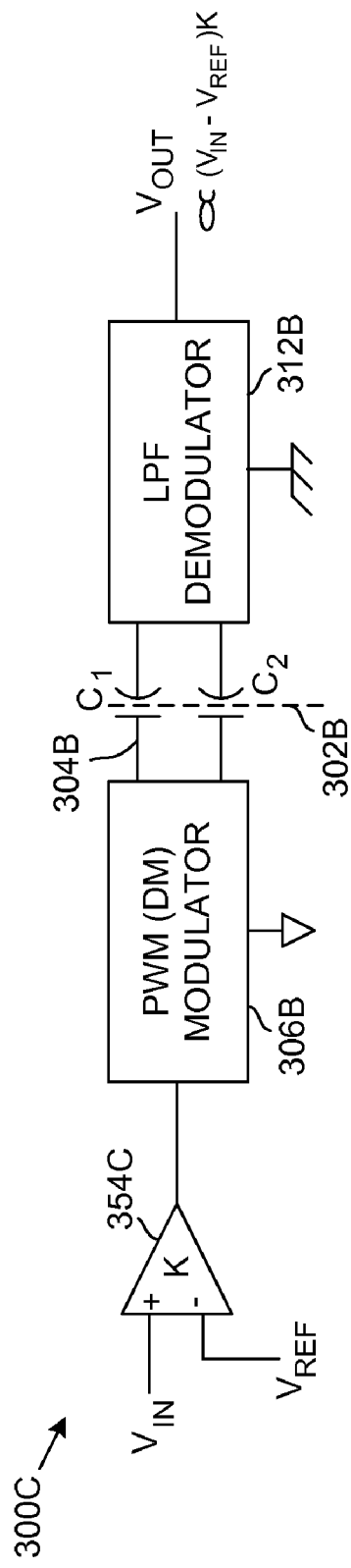

Referring to FIG. 3C in combination with FIG. 1, in some embodiments, the power converter 100 can include a signal isolator 160, 300C that further comprises an error amplifier 354C coupled to a signal input terminal of the pulse width modulator 306B and is configured for comparing the signal to a reference. The isolation circuit 500C forms a pathway including preconditioning and error recovery with the error amplifier 554C on an input side for comparing an input voltage to a reference voltage, thereby generating an output voltage which is a K-function of the difference.

Figure 3D:
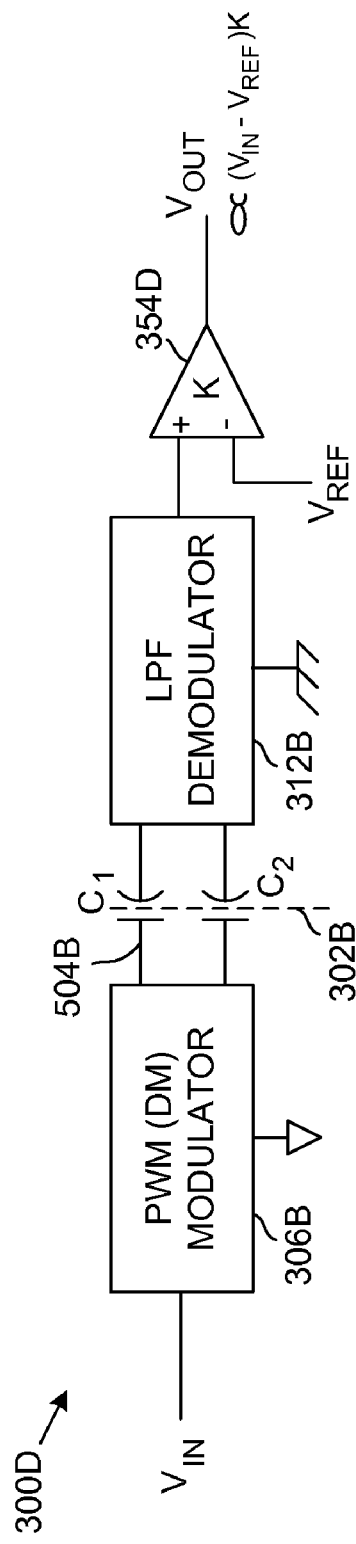

Referring to FIG. 3D in combination with FIG. 1, in some embodiments, the power converter 100 can include a signal isolator 160, 300D that further comprises an error amplifier 354D coupled to the lowpass filter modulator 306B that regulates the error recovered signal upon reconstruction. The isolation circuit 300D forms the pathway with the error function positioned after the signal is reconstructed. The error equation for the implementations shown in FIGS. 3C and 3D function according to the same basic equation. The error function is typically included in the pathway, although some embodiments may omit the function.

Figure 4A:
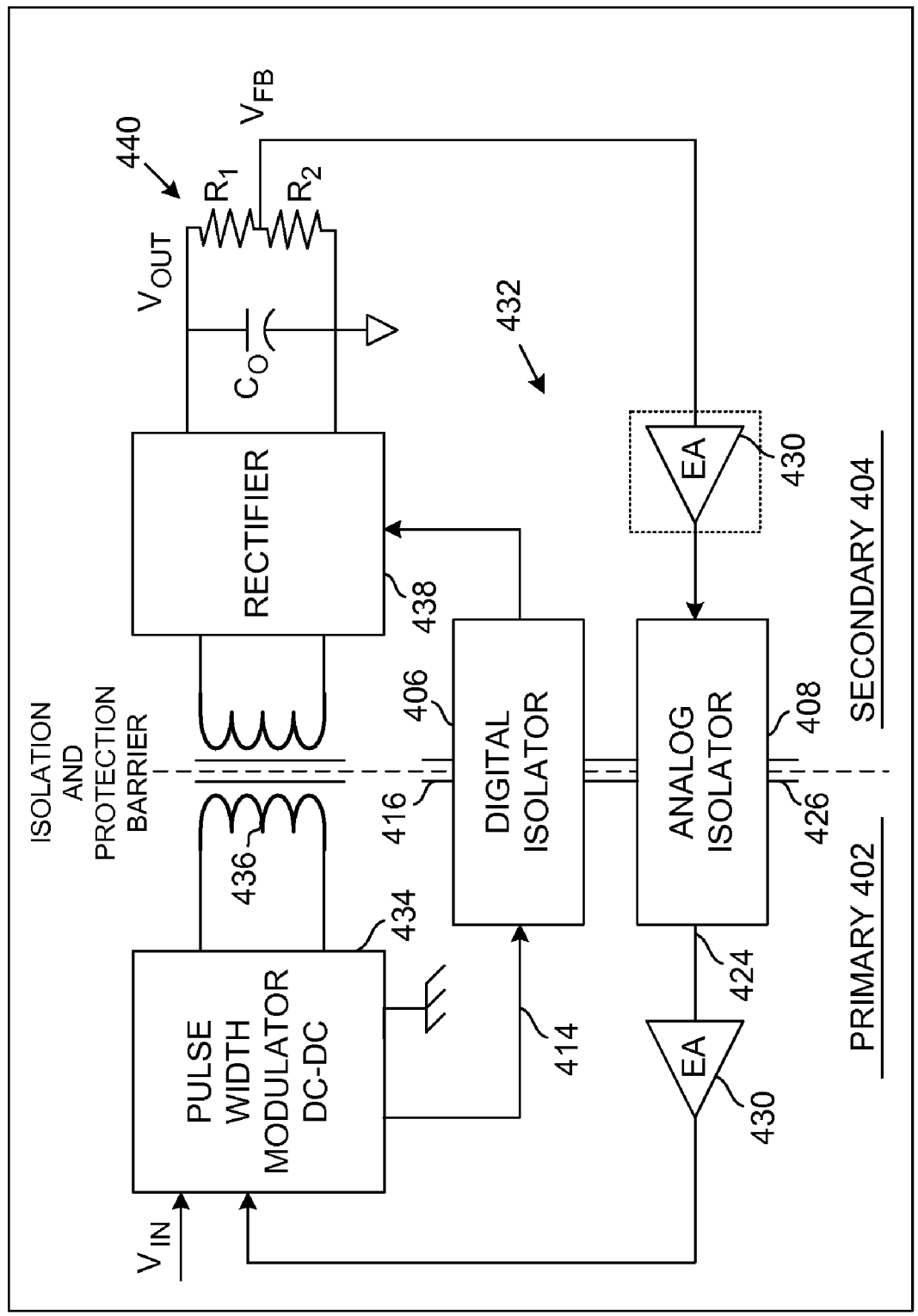
FIG. 4A is a combined block and circuit diagram illustrating an embodiment of a power controller including a signal isolator configured as a dual-channel bidirectional isolator coupling a primary domain and a secondary domain.

Referring to FIG. 4A, a combined block and circuit diagram illustrates an embodiment of a power controller 400 that includes a bidirectional signal isolator 432. The illustrative power controller 400 comprises a direct current (DC)-DC converter 434 configured to receive an input voltage $V_{IN}$ in a primary domain 402, a transformer 436 coupled to and driven by the DC-DC converter 434 that supplies an output voltage $V_{OUT}$ in a secondary domain 404, and a dual-channel bidirectional isolator 432 forming a transmission path 414, 424 that passes a signals through an isolation barrier 416, 426 between the primary domain 402 and the secondary domain 404. The dual-channel bidirectional isolator 432 comprises a digital isolator 406 and an analog isolator 408 coupled in parallel between the primary domain 402 and the secondary domain 404 configured to transmit data in opposing directions.

The power controller 400 includes a DC-DC converter 434 with an isolated path 414, 424 for transmitting varied kinds of signal.

The digital isolator 406 passes digital data transmission signals from the primary domain 402 to the secondary domain 404. The analog isolator 408 passes analog information back from the secondary domain 404 to the primary domain 402.

In an illustrative implementation, the digital isolator 406 can be configured to pass digital information including shut down, power-on-reset, status information, control information, and the like.

In some embodiments, the power controller 400 can further comprise an error amplifier 430 coupled to the dual-channel bidirectional isolator 432 at a primary domain connection or a secondary domain connection. The error amplifier 430 performs feedback regulation.

The power controller 400 diagram illustrates a structure and associated technique for transmitting signals across an isolation barrier 416, 426. The DC-DC converter 434 in a primary domain 402 passes power to a transformer 436. The transformer 436 transfers power to a secondary domain 404 which includes a rectifier 438 and several discrete components. The rectifier 438 is a functional block that can perform rectification or signal conditioning in many ways. Signals are passed between the primary domain 402 and the secondary domain 404 in two communication pathways. The DC-DC converter 434 in the primary domain 402 passes a digital signal to the secondary domain 404 via a digital isolator 406. A feedback signal $V_{FB}$ is returned from the secondary domain 404 to the DC-DC converter 434 in the primary domain 402 over an isolating pathway that includes analog-to-digital conversion (ADC) 408. The ADC 408 can be implemented using a variety of different structures and functional methods. The ADC can be single-ended or differential, and can have capacitive-coupling.

A return communication signal path from the secondary domain 404 to the primary domain 402 is also a transmission path incorporating an isolation barrier 402. The return transmission path can carry a feedback signal $V_{FB}$ back to the primary domain 402 and to the DC-DC converter 434. The return transmission pathway can include an error amplifier 430 which is shown on the primary domain 402 but can otherwise be positioned on the secondary domain 404, as shown in dotted lines. For an analog return signal pathway, the feedback signal $V_{FB}$ is used to control the power controller feedback loop. The feedback loop of the DC-DC converter 434 passes through the transformer 436, the rectifier 438, a capacitor $C_O$, a resistor divider 440, through the analog digital transmission path, and back into the DC-DC converter 434. The loop is a regulatory loop for regulating power distribution. The error amplifier 430 is included to complete the regulation functionality. Error amplifier functionality can be on either the primary domain 402 or the secondary domain 404 of the isolation barrier 402.

A signal from the DC-DC converter 434 is passed through the digital isolator 406 and into the rectifier 438 to enable synchronous rectification. The digital information pathway through the digital isolator 406 can carry various other information elements in addition to the rectification signal including shut down, enable, power on reset, or a variety of different types of different status or information data which is desired to be send back and forth between the primary domain 402 and the secondary domain 404.

The forward path is depicted as a DC-DC converter 434 but other types of paths can be formed. Some implementations can replace the transformer with another type of transmission path and isolation barrier, for example high voltage capacitors. Accordingly, some other type of power path can be implemented and controlled via a feedback loop. One of paths is a feedback path that transmits a digitized form of the feedback and forms a control loop. In various embodiments, the forward path and feedback path can form a servo loop or other type of digital path that can communicate in either direction across the isolation barrier.

The feedback signal is represented as a digital signal passing through a capacitor that is fed back to the DC-DC converter 434 for controlling power passed through the power isolation barrier from the primary domain 402 to the secondary domain 404.

Referring to FIG. 4B, a block and circuit diagram shows an embodiment of a digital isolator 406 that can be implemented in the isolator 432. The digital isolator 406 comprises a preconditioner 410 adapted to receive an input signal 412 and precondition the input signal 412 using a modulation function and a transmission path 414 comprising an isolation barrier 416 coupled to the pre-conditioner 410 for passing a preconditioned signal. The digital isolator 406 can further comprise a digital recovery circuit 418 coupled to the transmission path 414.

The transmission path 414 is illustratively shown as an isolation barrier 416 formed by a capacitor $C_{ISO}$. The isolation barrier 416 can be constructed in a variety of forms such as a capacitive isolation barrier, an electrostatic isolation barrier, a transformer isolation barrier, a magnetic isolation barrier, an optical isolation barrier, a thermal isolation barrier, a resistive isolation barrier, a piezoelectric isolation barrier, or others.

The digital isolator 406 is shown as a digital transmission block with a dashed-line indicating the isolation boundary. One example of a component that can be implemented for passing data or other information across the boundary is a capacitor $C_{ISO}$. Accordingly, the digital isolator 406 can be configured as one or more capacitors although other embodiments can be any type of barrier transmission path. In various implementations the type of isolation and associated digital isolator can be electrostatic isolation as a capacitor, a magnetic isolation formed as a transformer, a light isolation formed as an optical isolator. Other techniques can also transmit information across the boundary using other effects such as thermal, resistive, or more unusual forms such as piezoelectric and the like. Accordingly, information data signals can be passed, for example as digital information, from the primary domain 402 to the secondary domain 404, and information that can include feedback signals is communicated back from the secondary domain 404 to the primary domain 402, usually as analog signals although some implementations can return digital signals.

Referring to FIG. 4C, a block and circuit diagram shows an embodiment of an analog isolator 408 that can be implemented in the isolator 432. The analog isolator 408 can comprise an analog-to-digital converter (ADC) 420 adapted to receive and precondition a feedback signal 422 and a transmission path 424 comprising an isolation barrier 426 coupled to the ADC 420 for passing a preconditioned signal. The analog isolator 408 also comprises a digital-to-analog converter (DAC) 428 coupled to the transmission path 424.

The transmission path 424 is illustratively shown as an isolation barrier 426 formed by a capacitor $C_{ISO}$. In other embodiments, the isolation barrier 426 can be a capacitive isolation barrier, an electrostatic isolation barrier, a transformer isolation barrier, a magnetic isolation barrier, an optical isolation barrier, a thermal isolation barrier, a resistive isolation barrier, a piezoelectric isolation barrier, or the like.

In various embodiments, the analog-to-digital converter (ADC) 420 can be configured to convert, sample, and modulate and analog signal into digital format and pass the digital format signal through a capacitor $C_{ISO}$ in the transmission path 424. The digital-to-analog converter (DAC) 428 can be configured to recover the signal to a baseband analog signal.

FIGS. 4B and 4C can also show example embodiments of the digital isolator 432 depicted in FIG. 4A. FIG. 4B illustrates the digital isolator 432 in a form that receives a digital input signal and passes the digital signal to a driver 410 or other pre-conditioner. The preconditioned signal passes through an isolation capacitor $C_{ISO}$ to a digital recovery block 418 and then to a digital data output terminal.

FIG. 4C can also illustrate an analog signal implementation of the digital isolator 406. An analog signal path has an analog signal that is passed through an analog-to-digital converter (ADC) of some type. Many types of components or devices can be implemented to perform the conversion function to convert, sample, and modulate the analog signal into a digital format for passage through a transmission path with an isolation barrier, such as a capacitor. The digital signal passes to a signal recovery device or component such as a digital-to-analog converter (DAC) to return a base-band analog signal.

Figure 5:
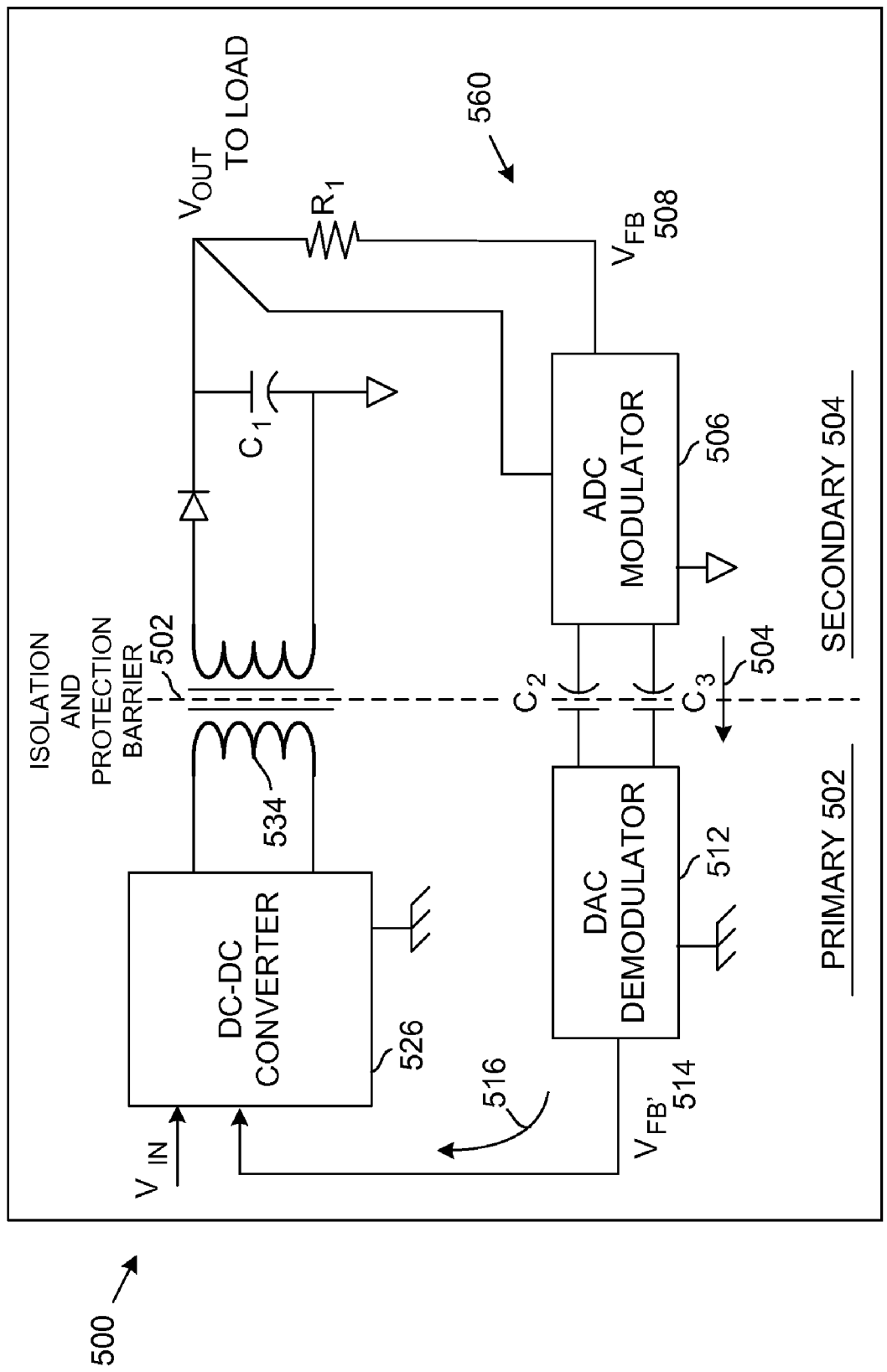
FIG. 5 is a schematic block and circuit diagram illustrates an embodiment of a power controller including a signal isolator that uses capacitors to couple a feedback signal across an isolation barrier.

Referring to FIG. 5, a schematic block and circuit diagram illustrates an embodiment of a power controller 500 including a signal isolator 560 that uses capacitors to couple a feedback signal across an isolation barrier 502. The illustrative power controller 500 comprises a power converter 526 configured to receive an input voltage VIN in a primary domain 502, and a transformer 534 coupled to and driven by the power converter 526 that supplies an output voltage $V_{OUT}$ in a secondary domain 504. An isolated transmission path 504 couples the primary domain 502 and the secondary domain 504. A modulator 506 receives the output voltage $V_{OUT}$ and conditions the signal for transmission via the isolated transmission path 504. A demodulator 512 receives the transmitted signal and recovers a feedback signal $V_{FB}$, for usage in a control loop 516.

In various embodiments, the modulator 506 can be implemented as an analog-to-digital converter; a pulse code modulator, a delta modulator, a voltage to frequency converter, a frequency modulator, a phase modulator, a single-ended analog-to-digital converter (ADC) modulator, a differential ADC modulator, or a capacitively-coupled ADC modulator, or other suitable device.

The modulator 506 can be constructed as an analog-to-digital converter (ADC) that performs any appropriate modulation such as delta modulation or pulse width modulation to convert a voltage signal to a pulse width signal, frequency modulation to convert the voltage signal to frequency, and a phase modulator to convert the voltage signal to a phase. If the ADC is implemented as a pulse width modulator or delta modulator, the corresponding demodulator 512 is typically constructed as a low pass filter with frequency modulation constant.

The illustrative transmission path 504 is implemented as a pair of capacitors with differential capacitor coupling. In other embodiments, the isolated transmission path can be constructed as one or more capacitors such as with single capacitor coupling, or can be constructed using other devices such as transformers, optical isolators, thermal isolating elements, or others.

The illustrative isolation circuit 560 uses a capacitor, such as a high voltage capacitor, to couple a feedback signal across an isolation barrier. A DC feedback signal is sampled at high frequency or modulated on a secondary side, passed through a coupling capacitor, and demodulated on the primary side.

The illustrative demodulator 512 is depicted as a digital-to-analog converter (DAC). In other implementations, the demodulator 512 can be other suitable devices.

A specific example of an isolation circuit 560 including an ADC modulator 206 or other modulation scheme such as a pulse code modulator, delta modulator, voltage to frequency conversion modulator, an isolated transmission path 504, and a DAC demodulator 512 can be a class D amplifier that receives and modulates an input signal such as an audio signal, and drives a speaker by passing the signal through a capacitor.

Figure 6C:
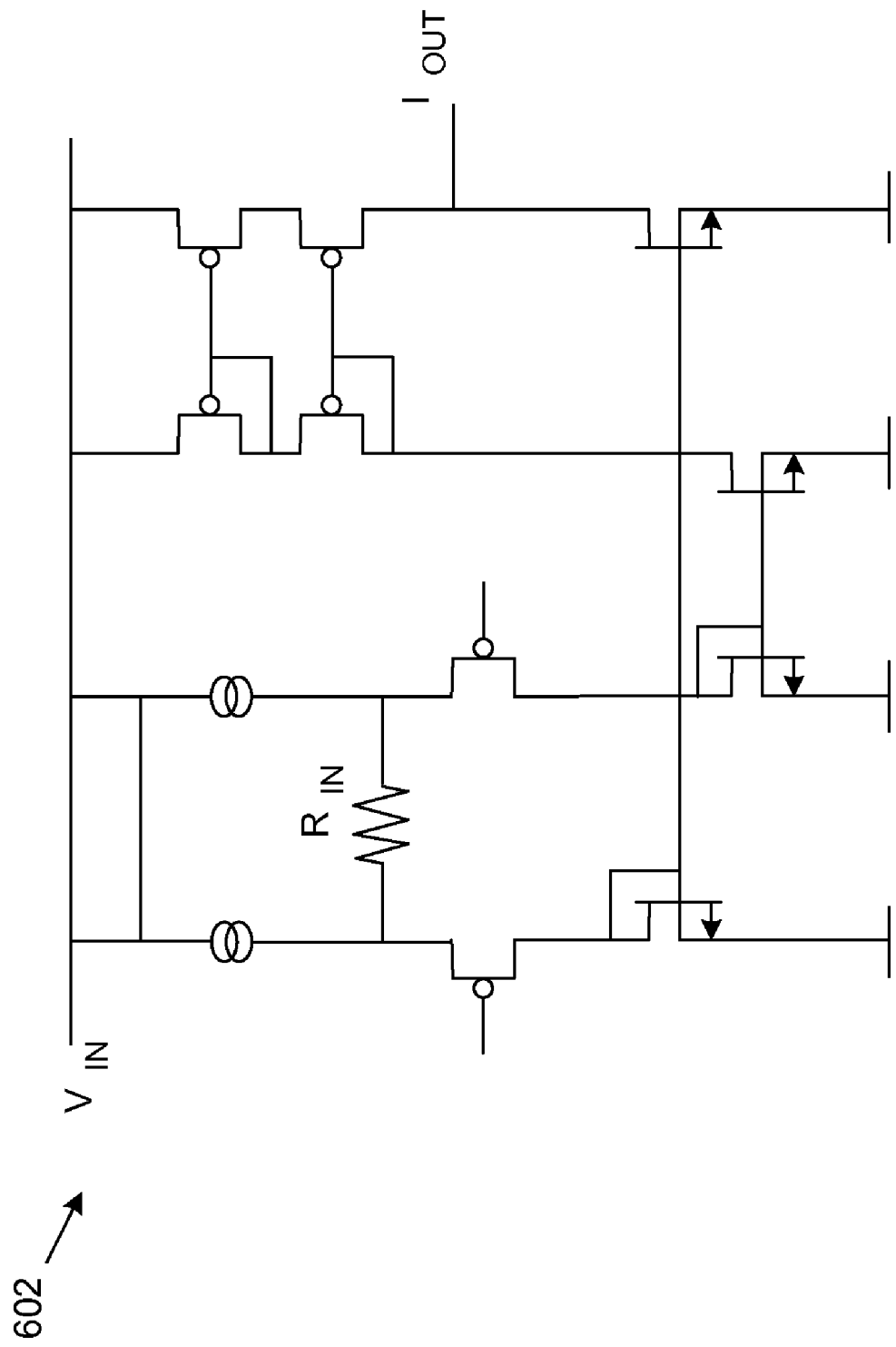

Referring to FIG. 6A, a schematic block diagram shows an example of an embodiment of a pulse width modulator 600 that can be used in the illustrative power controllers. Modulation can be implemented using techniques other than pulse width modulation and pulse with modulation can be implemented in many other forms. An input voltage $V_{IN}$ is applied to a voltage to current converter 602 and passed to a delta modulator 604 to product a digital signal $D_O$. FIG. 6B shows an example implementation of the delta modulator 604. FIG. 6C illustrates an example implementation of the voltage to current converter 602.

Referring to FIG. 6B, the illustrative delta modulator 602 has a self-oscillatory signal loop or hysteretic oscillation loop 606 and performs simultaneous frequency derivation and pulse width modulation. The delta modulator 602 uses a dual set of comparators 608 coupled into the oscillatory signal loop 606. The comparator 608 in the feedback portion of the loop 606 supplies two clock signals which are switched and passed back to the comparator 608 in the input portion of the loop. Other embodiments of a delta modulator can include a fixed clock in place of the feedback loop. In another implementation, a clock signal can be driven as an input signal to produce a pulse width modulation output signal.

FIG. 6C illustrates an embodiment of a voltage to current converter 602 that can be used in the pulse width modulator 600.

Figure 7:
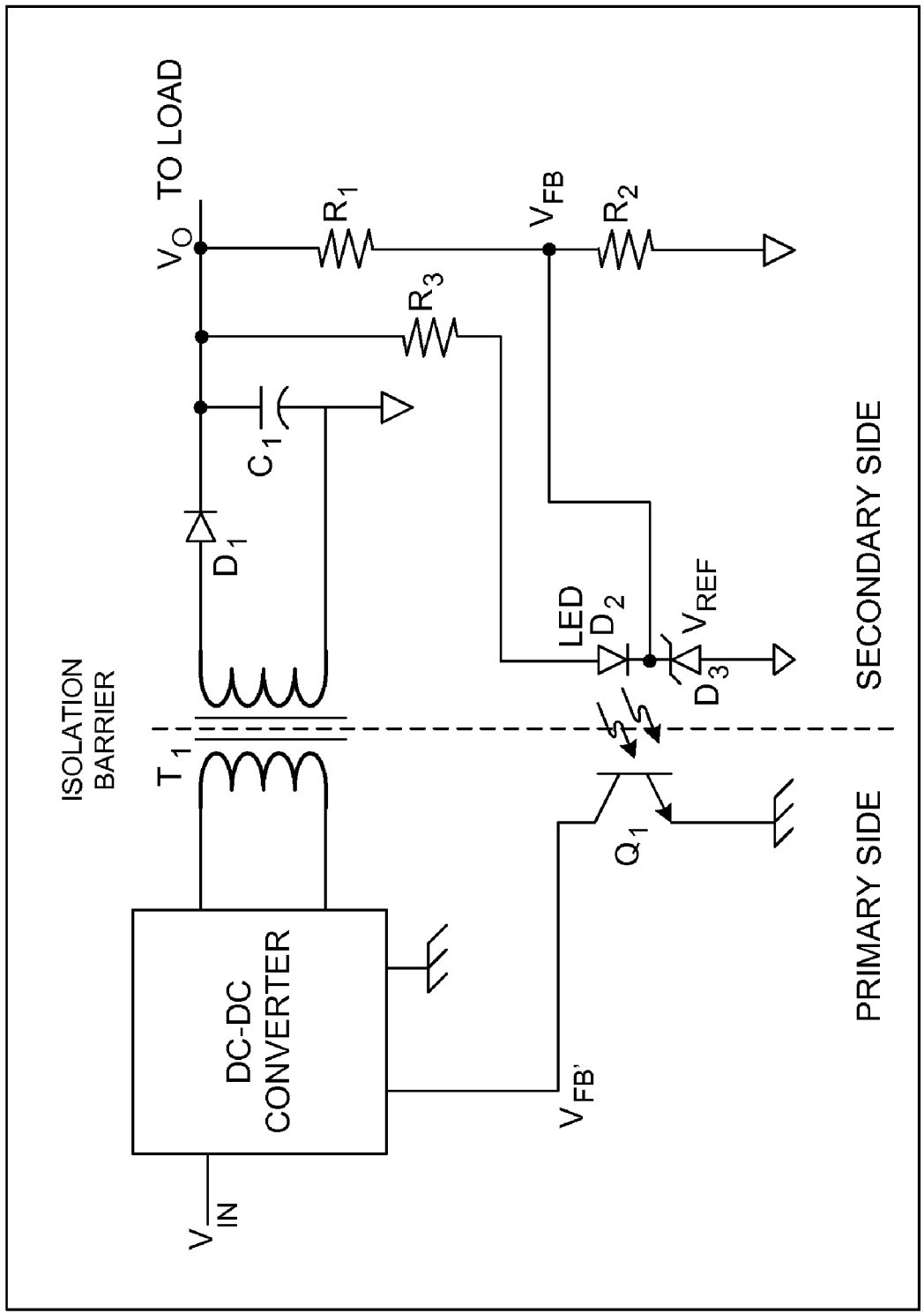
FIG. 7 is a schematic block diagram illustrating an embodiment of an isolated power converter that includes a DC-DC converter and optical coupler isolation.

Referring to FIG. 7, a schematic block diagram illustrates an embodiment of an isolated power converter that includes a DC-DC converter and optical coupler isolation. The power distribution circuit has an input supply voltage applied into the DC-DC converter, a transformer, a rectifying function include in the integration, and an opto-isolator for crossing the barrier with the information. An error function is formed on the secondary side as a light-emitting diode (LED) stacked on a voltage so the output feedback voltage is compared to an internal reference voltage and the difference of the comparison is represented by the current in the transistor Q1 which is labeled a feedback error signal.

In contrast, in the various embodiments shown in FIGS. 1 through 6, the feedback signal is passed through some type of modulation scheme, transmitted on a pathway that includes an isolation barrier, then passed to some type of demodulation. Any suitable type of modulation can be implemented, for example a simple analog-to-digital converter or other simple rectifier. The transmission pathway including an isolation barrier can be any suitable technology, for example one or more capacitors, or other technology. Generally, demodulation can be selected to suitably recover a signal according to the implemented type of modulation.

Modulation can be implemented in a variety of different ways, including but not limited to pulse width modulation (PWM), delta modulation (DM), frequency modulation (FM), phase modulation, and others. Modulation can be used to generate samples in any kind of sample system to produce a serial bit stream with information represented by packets. For example, in classic pulse code modulation, sampling can be implemented to form an eight-bit word so that packets of eight-bit words represent a sample.

In contrast, other embodiment may implement modulation in a form that is not a true sampled data system where the information is carried in a set number of bits like an eight-bit or other size word.

For example, an entire framed serial path can be embedded that transmits information as packets that may be 64-bits long and transmitted at 10 MHz or 100 MHz and used to control the feedback loop. Other information can also be communicated on the serial path, for example data or control information such as temperature issues, control signals for shutdown, or any other information that can be usefully passed.

A simpler implementation of the feedback path can convey in the feedback as a relative variation in feedback voltage end up, whether higher or lower, in a continuous analog approach.

In contrast to a power converter that uses optical techniques for isolation, the illustrative embodiments shown in FIGS. 1 through 6, can enable production of a circuit with the entire path formed in a single integrated circuit or within a single package. For example, isolation barriers formed using capacitors can be integrated into a single integrated circuit chip. In some implementations, the isolation barrier can be formed using magnetic inductors that can be implemented with the entire loop in a single package. Optical isolators cannot easily be integrated into a single package with the DC-DC converter because an optical isolator system includes three disparate components: a light emitting diode (LED), a phototransistor, and an error amplifier or reference, to perform communication with optical isolation alone. The embodiments shown in FIGS. 1 through 6 enable production of a realizable circuit in simple packaging and lower cost.

Figure 8A:
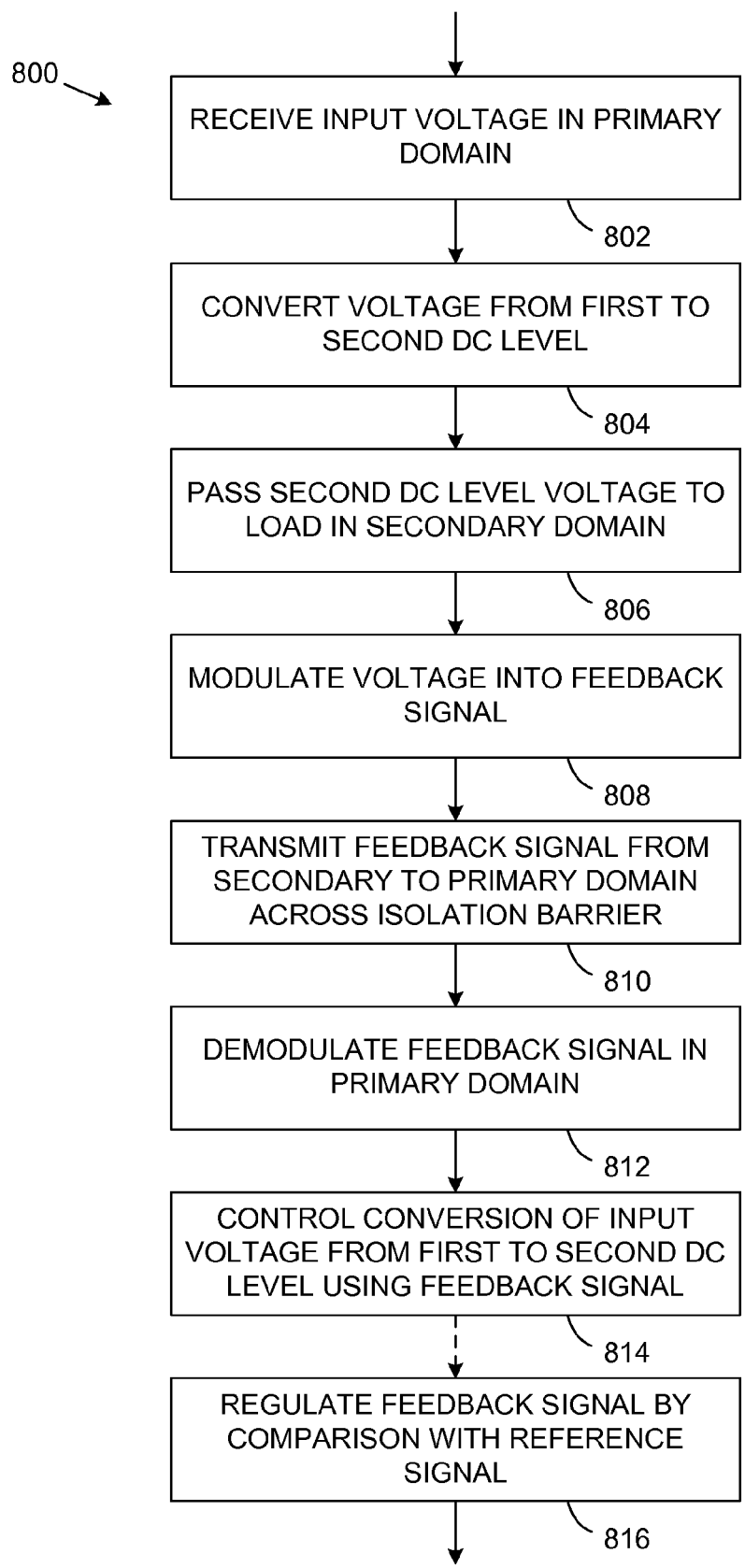
FIGS. 8A through 8E are a group of flow charts depicting aspects of methods that can be implemented individually or in combination in one or more embodiments for controlling power in an electrical system.

Referring to FIGS. 8A through 8E, a group of flow charts depict aspects of methods that can be implemented individually or in combination in one or more embodiments for controlling power in an electrical system. FIG. 8A shows a method 800 comprising receiving 802 an input voltage in a primary domain, converting 804 the input voltage from a first direct current (DC) level to a second DC level, and passing 806 the converted voltage to a load at a secondary domain. The converted voltage is modulated 808 into a feedback signal and the feedback signal is transmitted 810 from the secondary domain to the primary domain across an isolation barrier. The feedback signal is demodulated 812 in the primary domain, controlling 814 conversion of the input voltage from the first to the second DC level using the demodulated feedback signal.

In various embodiments, passing 806 the preconditioned signal through the isolation barrier can be implemented by passing the signal through a capacitive isolation barrier, an electrostatic isolation barrier, a transformer isolation barrier, a magnetic isolation barrier, an optical isolation barrier, a thermal isolation barrier, a resistive isolation barrier, a piezoelectric isolation barrier, or other barrier.

In various embodiments, the preconditioned signal can be passed 806 through a single-ended isolation barrier or a differential isolation barrier.

In some embodiments, the method 800 can further comprise regulating 816 the feedback signal by comparison with a reference signal.

Figure 8B:
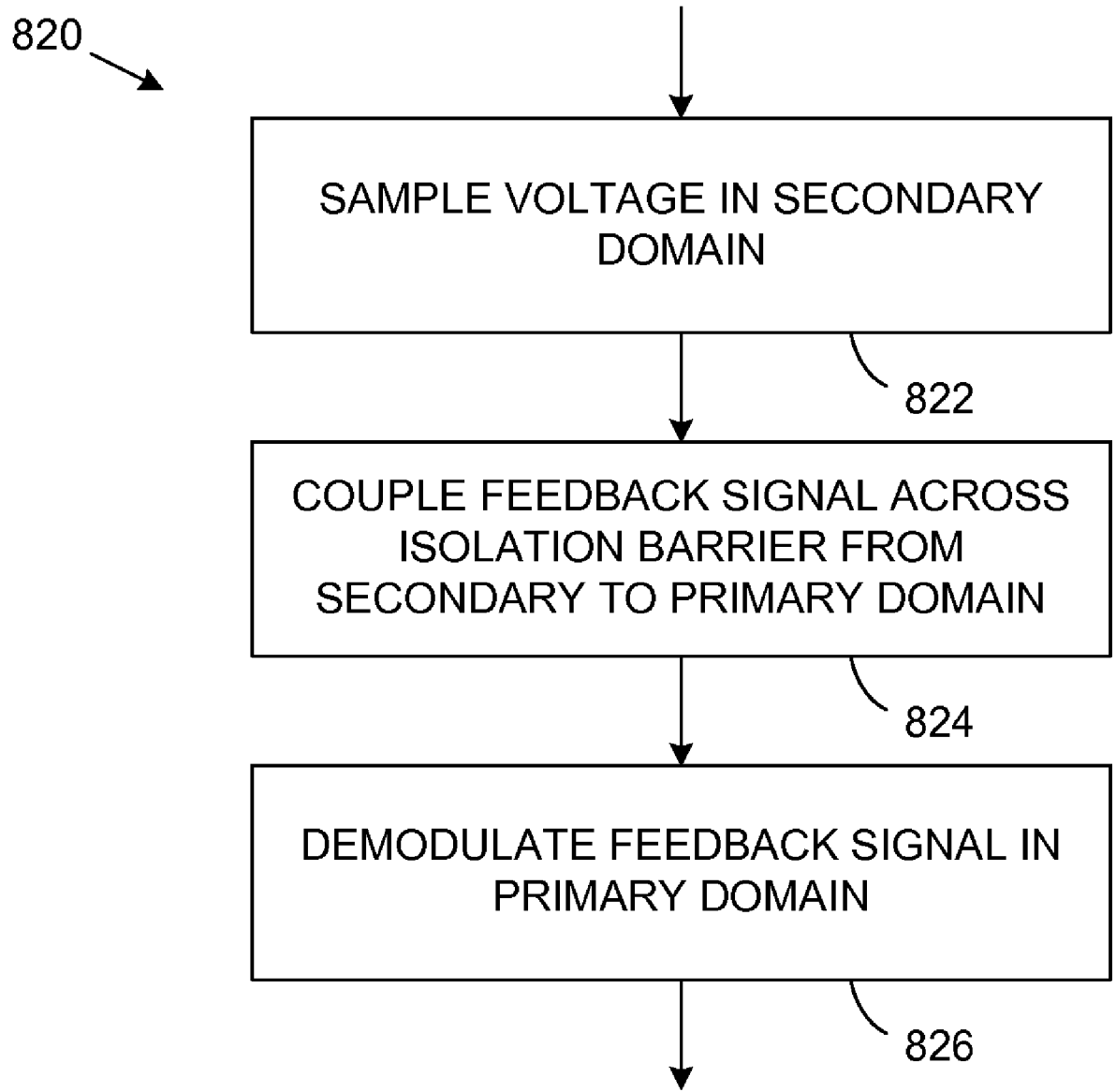

Referring to FIG. 8B, controlling power can include a method for transmitting 820 a signal across the isolation barrier comprising sampling 822 the converted voltage in the secondary domain whereby the converted voltage is modulated and coupling 824 the feedback signal across the isolation barrier from the secondary domain to the primary domain through a capacitor. The feedback signal can be demodulated 826 in the primary domain.

Figure 8C:
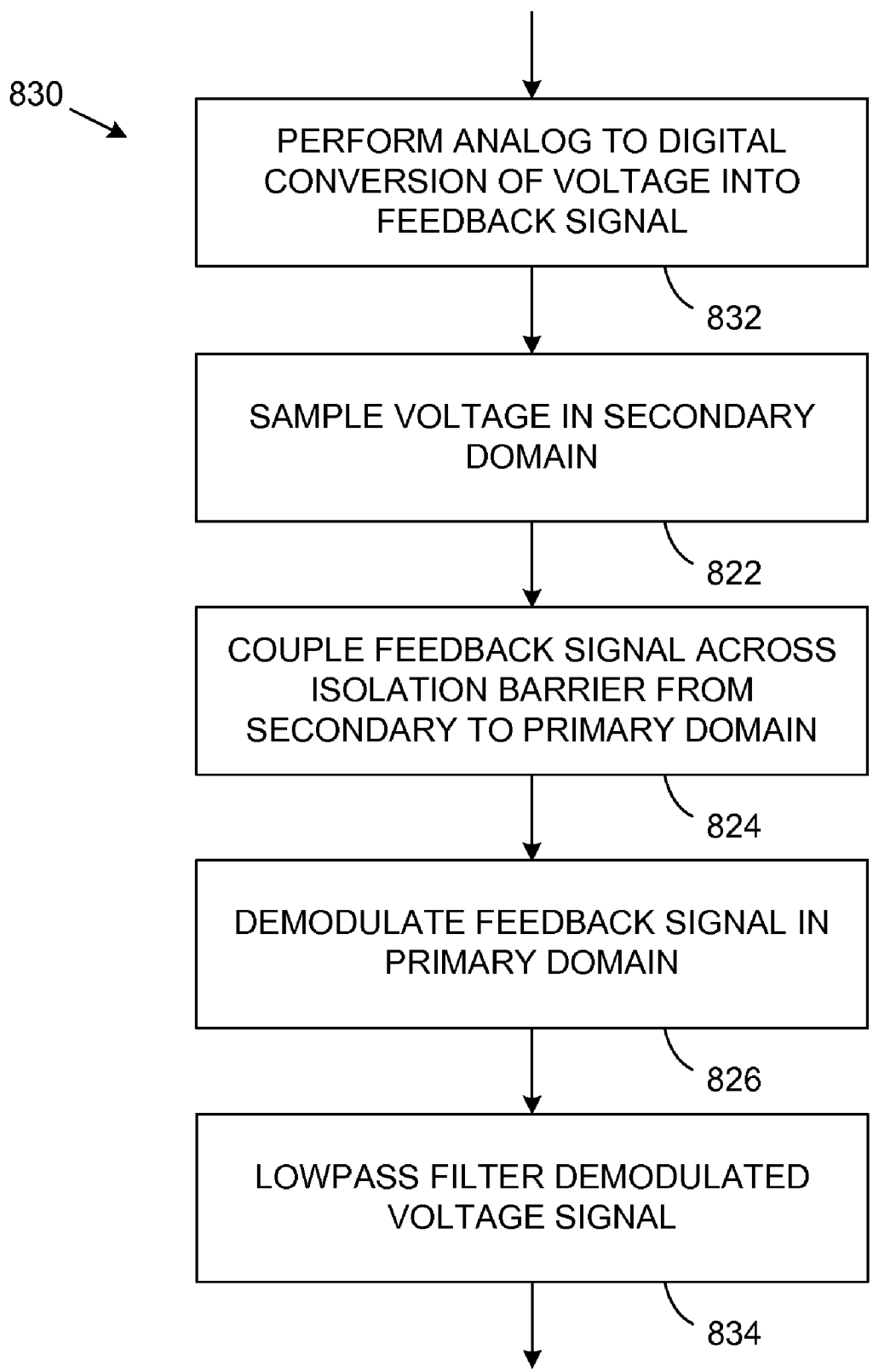

Referring to FIG. 8C, controlling power can include a method for transmitting 830 a signal across the isolation barrier can further comprise performing 832 analog to digital conversion of the converted voltage whereby the converted voltage is modulated into the feedback signal. The feedback signal can be lowpass filtered 834 whereby the feedback signal is demodulated in the primary domain.

Figure 8D:
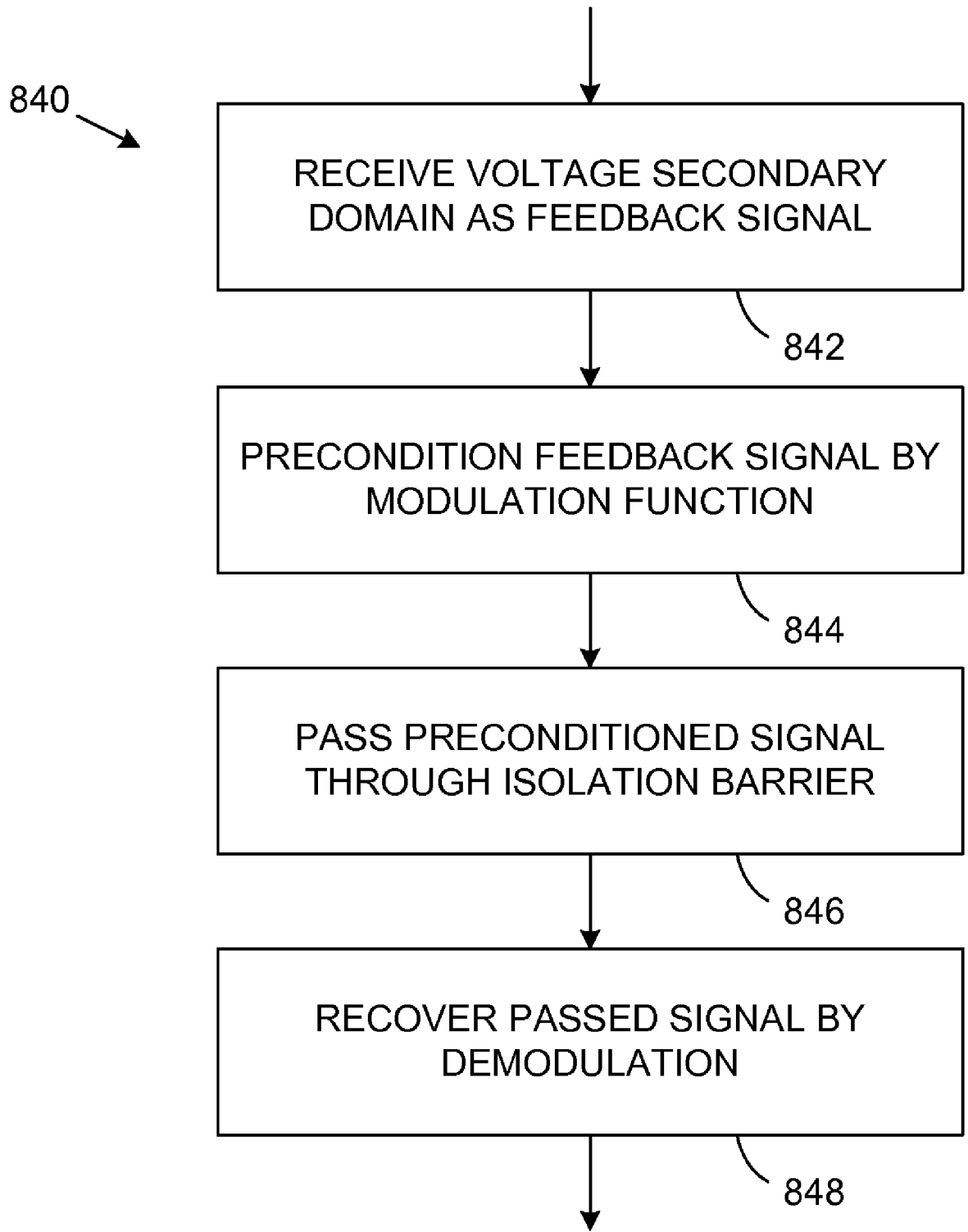

Referring to FIG. 8D, controlling power can include a method for transmitting 840 a signal across the isolation barrier comprising receiving 842 the converted voltage in the secondary domain as the feedback signal, preconditioning 844 the feedback signal according to a modulation function, and passing 846 the preconditioned signal through the isolation barrier. The passed signal can be recovered 848 according to a demodulation function corresponding to the modulation function, the recovered signal being operative as a feedback signal.

In various embodiments, preconditioning 844 the feedback signal can comprise converting the feedback signal from an analog signal to a digital signal according to a modulation function such as pulse width modulation, delta modulation, frequency modulation, phase modulation, or other suitable modulation.

Recovering 848 the passed signal can be implemented according to a bistable multivibrator operation or digital to analog conversion.

Figure 8E:
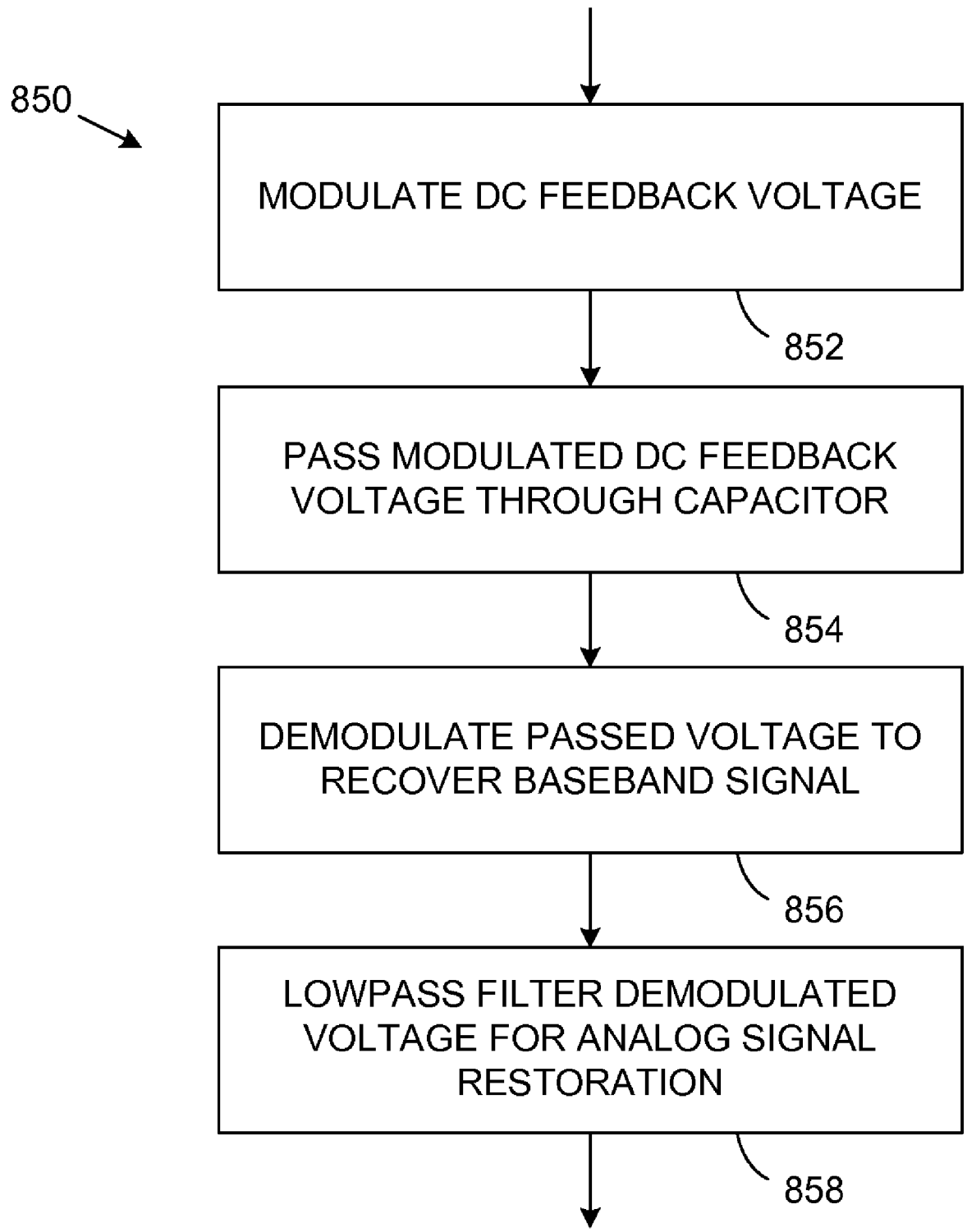

Referring to FIG. 8E, controlling power can include a method for transmitting 850 a signal across the isolation barrier comprising modulating 852 a direct current (DC) feedback voltage, passing 854 the modulated DC feedback voltage through a capacitor by oversampling, and demodulating 856 the passed voltage to an increased frequency, thereby recovering a baseband signal. The demodulated voltage can be lowpass filtered 858 to restore an analog signal.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a communication or isolation system are described including several optional implementations for particular portions. Any suitable combination or permutation of the disclosed designs may be implemented.

What is claimed is:

1. A power converter comprising:
   DC-DC converter configured to receive an input voltage in a primary domain;
   a transformer coupled to and driven by the DC-DC converter and supplying an output voltage in a secondary domain; and
   a transmission path configured to pass a digital feedback signal through an isolation barrier from the secondary domain to the primary domain, the transmission path comprising a signal modulator coupled in the secondary domain at a secondary ground potential, a signal demodulator coupled in the primary domain at a primary ground potential, and the isolation barrier comprising an AC-coupling that transmits a digital signal wherein information is conveyed in an analog format from the signal modulator to the signal demodulator.

2. The power converter according to claim 1 further comprising:
a signal conditioner coupled to the transmission path in the secondary domain and adapted to receive an input signal and precondition the input signal according to a modulation function for passing a preconditioned signal via the transmission path; and
a signal recovery circuit coupled to the transmission path in the primary domain that receives the preconditioned signal via the transmission path and demodulates the preconditioned signal, forming a feedback signal for usage in a control loop.

3. The power converter according to claim 1 further comprising:
a signal conditioner comprising an analog to digital converter coupled to the transmission path in the secondary domain and adapted to receive an input signal and precondition the input signal according to a modulation function for passing a preconditioned signal via the transmission path;
the transmission path comprising at least one capacitor; and
a signal recovery circuit comprising a digital to analog converter or flip-flop coupled to the transmission path in the primary domain that receives the preconditioned signal via the transmission path and demodulates the preconditioned signal, forming a feedback signal for usage in a control loop, wherein the power converter is implemented in a single integrated circuit.

4. The power converter according to claim 1 further comprising:
a signal conditioner comprising a modulator selected from a group consisting of a pulse width modulator, a delta modulator, a frequency modulator, and a phase modulator coupled to the transmission path in the secondary domain and adapted to receive an input signal and precondition the input signal according to a modulation function for passing a preconditioned signal via the transmission path; and
a signal recovery circuit coupled to the transmission path in the primary domain and configured to acquire an analog input signal, digitize the signal, and pass the digitized signal through a control system.

5. The power converter according to claim 1 further comprising:
a pulse width modulator (PWM) DC-DC converter coupled to drive a full-bridge transformer; and
an oscillator coupled to the PWM DC-DC converter and generating an oscillator time base for synchronously driving the PWM DC-DC converter.

6. The power converter according to claim 1 further comprising:
a rectifier coupled to the transformer; and
a filter coupled to the rectifier configured to supply a filtered output voltage.

7. The power converter according to claim 1 further comprising:
a pulse width modulator (PWM) DC-DC converter comprising a plurality of internal drivers and a plurality of external power field effect transistors (FETs) that drive the transformer;
a rectifier comprising a plurality of diodes or transmission gates coupled to the transformer; and
a filter comprising an inductor and a capacitor coupled to the rectifier configured to supply a filtered output voltage.

8. The power converter according to claim 1 further comprising:
a rectifier coupled to the transformer;
a resistor divider coupled to the rectifier and producing a feedback voltage in the secondary domain;
a signal conditioner coupled to the resistor divider and adapted to receive the feedback voltage and precondition the feedback voltage according to a pulse width modulator (PWM) or delta modulator (DM) modulation function;
at least one capacitor coupled to the signal conditioner and operative as an isolated transmission path; and
a signal recovery circuit coupled to the isolated transmission path in the primary domain and configured to receive the preconditioned feedback voltage and demodulate the preconditioned feedback voltage, forming a feedback signal for usage in a control loop.

9. The power converter according to claim 1 further comprising:
the transmission path comprising:
a modulator configured to receive and modulate a signal;
a diode bridge rectifier;
full differential alternating current (AC) coupling configured for transmitting the modulated signal from the modulator to the diode bridge rectifier with capacitive-coupled signal isolation; and
a D flip-flop coupled to the diode bridge rectifier and configured to recover the modulated signal.

10. The power converter according to claim 1 further comprising:
the signal isolator configured to modulate a direct current (DC) feedback voltage and pass the DC feedback voltage through at least one capacitor by oversampling and demodulating to a higher frequency whereby a baseband signal is recovered, the signal isolator inserting a sampling function in the transmission pathway, converting an analog signal to a digital form wherein samples have an associated digital value due to quantization of the analog signal through the sampling function.

11. The power converter according to claim 1 further comprising:
a pulse width modulator configured to precondition a signal;
a differential transmission isolation barrier coupled to the pulse width modulator and configured to pass a preconditioned signal; and
a lowpass filter demodulator coupled to the differential transmission isolation barrier and configured to perform error recovery on the passed preconditioned signal.

12. The power converter according to claim 1 further comprising:
an error amplifier coupled to the lowpass filter modulator and configured for regulating the error recovered signal upon reconstruction.

13. The power converter according to claim 8 further comprising:
the at least one capacitor configured as a single-ended or differential transmission path, wherein the power converter is implemented in a single integrated circuit.

14. The power converter according to claim 9 further comprising:
a lowpass filter coupled to the D flip-flop.

15. The power converter according to claim 11 further comprising:
an error amplifier coupled to a signal input terminal of the pulse width modulator and configured for comparing the signal to a reference wherein frequency is constant as a signal traverses a feedback path and information is contained in duty cycle.

16. A power controller comprising:
a DC-DC converter configured to receive an input voltage in a primary domain;
a transformer coupled to and driven by the DC-DC converter and supplying an output voltage in a secondary domain; and
a dual-channel bidirectional isolator forming a transmission path that passes signals through an isolation barrier between the primary domain and the secondary domain comprising:
a digital isolator and an analog isolator coupled in parallel between the primary domain and the secondary domain and configured to transmit data in opposing directions, the digital isolator passing a digital signal from the primary domain to the secondary domain that controls synchronous rectification of the output voltage.

17. The power controller according to claim 16 further comprising:
the digital isolator configured to pass digital data transmission signals from the primary domain to the secondary domain; and
the analog isolator configured to pass analog information back from the secondary domain to the primary domain.

18. The power controller according to claim 16 further comprising:
the digital isolator configured to pass digital information including shut down, power-on-reset, status information, and control information.

19. The power controller according to claim 16 further comprising:
the digital isolator comprising:
a pre-conditioner adapted to receive an input signal and precondition the input signal according to a modulation function;
a transmission path comprising an isolation barrier coupled to the pre-conditioner for passing a preconditioned signal; and
a digital recovery circuit coupled to the transmission path.

20. The power controller according to claim 16 further comprising:
the analog isolator comprising:
an analog-to-digital converter adapted to receive a feedback signal and precondition the feedback signal;
a transmission path comprising an isolation barrier coupled to the pre-conditioner for passing a preconditioned signal; and
a digital-to-analog converter coupled to the transmission path.

21. The power controller according to claim 16 further comprising:
an error amplifier coupled to the dual-channel bidirectional isolator at a primary domain connection or a secondary domain connection and configured for feedback regulation wherein frequency is constant as a signal traverses a feedback path and information is contained in duty cycle.

22. The power controller according to claim 19 further comprising:
the transmission path comprising an isolation barrier selected from a group consisting of a capacitive isolation barrier, an electrostatic isolation barrier, a transformer isolation barrier, a magnetic isolation barrier, an isolation barrier, a thermal isolation barrier, a resistive isolation barrier, and a piezoelectric isolation barrier.

23. The power controller according to claim 20 further comprising:
the transmission path comprising an isolation barrier selected from a group consisting of a capacitive isolation barrier, an electrostatic isolation barrier, a transformer isolation barrier, a magnetic isolation barrier, an optical isolation barrier, a thermal isolation barrier, a resistive isolation barrier, and a piezoelectric isolation barrier.

24. The power controller according to claim 20 further comprising:
the analog-to-digital converter configured to convert, sample, and modulate and analog signal into digital format and pass the digital format signal through a capacitor in the transmission path; and
the digital-to-analog converter configured to recover to a baseband analog signal, wherein the power controller is implemented in a single integrated circuit.

25. A power controller comprising:
a power converter configured to receive an input voltage in a primary domain;
a transformer coupled to and driven by the power converter and supplying an output voltage in a secondary domain;
an isolated transmission path coupled between the primary domain and the secondary domain;
a modulator coupled in the secondary domain at a secondary ground potential and configured to receive the output voltage that conditions the signal for transmission via the isolated transmission path; and
a demodulator coupled in the primary domain at a primary ground potential that receives the transmitted signal and recovers a feedback signal for usage in a control loop, the isolation barrier transmitting a digital signal wherein information is conveyed in an analog format from the modulator to the demodulator.

26. The power controller according to claim 25 further comprising:
the modulator selected from a group consisting of an analog-to-digital converter, a pulse code modulator, a delta modulator, a voltage to frequency converter, a frequency modulator, and a phase modulator.

27. The power controller according to claim 25 further comprising:
the modulator comprising a single-ended analog-to-digital converter (ADC) modulator, a differential ADC modulator, or a capacitively-coupled ADC modulator.

28. The power controller according to claim 25 further comprising:
the isolated transmission path comprises at least one capacitor, wherein the power controller is implemented in a single integrated circuit.

29. The power controller according to claim 25 further comprising:
the demodulator comprising a digital-to-analog converter (DAC).

30. A method for controlling power in an electrical system comprising:
  receiving an input voltage in a primary domain;
  converting the input voltage from a first direct current (DC) level to a second DC level;
  passing the converted voltage to a load at a secondary domain;
  modulating the converted voltage into a feedback signal;
  transmitting the feedback signal from the secondary domain to the primary domain across an isolation barrier wherein information is conveyed in an analog format;
  demodulating the feedback signal in the primary domain; and
  controlling conversion of the input voltage from the first to the second DC level using the demodulated feedback signal.

31. The method according to claim 30 further comprising:
  sampling the converted voltage in the secondary domain whereby the converted voltage is modulated;
  coupling the feedback signal across the isolation barrier from the secondary domain to the primary domain through a capacitor; and
  demodulating the feedback signal in the primary domain.

32. The method according to claim 30 further comprising:
  performing analog to digital conversion of the converted voltage whereby the converted voltage is modulated into the feedback signal; and
  lowpass filtering the feedback signal whereby the feedback signal is demodulated in the primary domain.

33. The method according to claim 30 further comprising:
  receiving the converted voltage in the secondary domain as the feedback signal;
  preconditioning the feedback signal according to a modulation function;
  passing the preconditioned signal through the isolation barrier; and
  recovering the passed signal according to a demodulation function corresponding to the modulation function, the recovered signal being operative as a feedback signal.

34. The method according to claim 30 further comprising:
  passing the preconditioned signal through the isolation barrier selected from a group consisting of a capacitive isolation barrier, an electrostatic isolation barrier, a transformer isolation barrier, a magnetic isolation barrier, an optical isolation barrier, a thermal isolation barrier, a resistive isolation barrier, and a piezoelectric isolation barrier.

35. The method according to claim 30 further comprising:
  passing the preconditioned signal through a single-ended isolation barrier or a differential isolation barrier.

36. The method according to claim 30 further comprising:
  modulating a direct current (DC) feedback voltage;
  passing the modulated DC feedback voltage through a capacitor by oversampling;
  demodulating the passed voltage to an increased frequency whereby a baseband signal is recovered; and
  lowpass filtering the demodulated voltage to restore an analog signal.

37. The method according to claim 30 further comprising:
  regulating the feedback signal by comparison with a reference signal.

38. The method according to claim 33 further comprising:
  preconditioning the feedback signal comprising converting the feedback signal from an analog signal to a digital signal according to a modulation function selected from a group consisting of pulse width modulation, delta modulation, frequency modulation, and phase modulation.

39. The method according to claim 33 further comprising:
  recovering the passed signal according to a bistable multivibrator operation or digital to analog conversion.

* * * * *